(12) United States Patent
Lo

(10) Patent No.: US 7,705,353 B2
(45) Date of Patent: Apr. 27, 2010

(54) BONDING PAD, ACTIVE DEVICE ARRAY SUBSTRATE AND LIQUID CRYSTAL DISPLAY PANEL

(75) Inventor: Shih-Chieh Lo, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 12/325,247

(22) Filed: Nov. 30, 2008

(65) Prior Publication Data

US 2010/0032672 A1 Feb. 11, 2010

(30) Foreign Application Priority Data

Aug. 11, 2008 (TW) ............... 97130536 A

(51) Int. Cl.
*H01L 23/58* (2006.01)
(52) U.S. Cl. ............... 257/48; 257/72; 257/749; 257/E23.02
(58) Field of Classification Search ............... 257/749, 257/734, 72, 48, E23.02
See application file for complete search history.

(56) References Cited

U.S. PATENT DOCUMENTS 6,825,497 B2 * 11/2004 Lai ........................ 257/72

FOREIGN PATENT DOCUMENTS

JP 2002-258319 9/2002

* cited by examiner

*Primary Examiner*—Davienne Monbleau
*Assistant Examiner*—Monica D Harrison
(74) *Attorney, Agent, or Firm*—Jianq Chyun IP Office

(57) ABSTRACT

A bonding pad includes a metal layer, a gate insulating layer, a passivation layer, and a transparent conductive layer. The metal layer has a first metal pattern and a second metal pattern which are separated from each other. The gate insulating layer covers the metal layer, and the passivation layer covers the gate insulating layer. The gate insulating layer and the passivation layer have a first contact opening and a second contact opening respectively exposing a portion of the first metal pattern and a portion of the second metal pattern. The transparent conductive layer covers the passivation layer and fills the first and second contact openings. The transparent conductive layer on the second contact opening serves as a testing-probe contact area. The present invention also provides an active device array substrate having the bonding pad.

9 Claims, 5 Drawing Sheets

BONDING PAD, ACTIVE DEVICE ARRAY SUBSTRATE AND LIQUID CRYSTAL DISPLAY PANEL

CROSS-REFERENCE TO RELATED APPLICATION

This application claims the priority benefit of Taiwan application serial no. 97130536, filed on Aug. 11, 2008. The entirety of the above-mentioned patent application is hereby incorporated by reference herein and made a part of this specification.

BACKGROUND OF THE INVENTION

1. Field of the Invention

The present invention relates to a bonding pad, an active device array substrate having the bonding pad, and a liquid crystal display (LCD) panel having the bonding pad. More particularly, the present invention relates to a bonding pad capable of improving a rate of inspecting and detecting the defects of bonding pad impedance detects.

2. Description of Related Art

An LCD mainly includes an LCD panel and a back light module. The LCD panel is constituted by a thin film transistor (TFT) array substrate, a color filter (CF) substrate, and a liquid crystal layer sandwiched therebetween. Here, the TFT array substrate includes devices, such as TFTs, scan lines, data lines, pixel electrodes, and so forth. Note that end portions of the data lines and end portions of the scan lines are electrically connected to bonding pads, and the bonding pads are electrically connected to driving devices in subsequent processes, such that signals are able to be transmitted from the driving devices to the LCD panel.

In general, an electrical inspection is performed on the devices disposed on the TFT array substrate after the fabrication of the TFT array substrate is completed. Besides, after the TFT array substrate and the CF substrate are assembled to form the LCD panel, the electrical inspection is also performed thereon. Said inspections are conducted by means of the bonding pads located at the end portions of the data lines and the end portions of the scan lines.

The electrical inspection conventionally performed by means of the bonding pads is described hereinafter. FIG. 1A is a top view of a conventional bonding pad. FIG. 1B is a schematic cross-sectional view of the bonding pad depicted in FIG. 1A. Referring to FIGS. 1A and 1B, a bonding pad 100 is electrically connected to a date line 102a or a scan line 102a. The bonding pad 100 includes a metal layer 102, a gate insulating layer 104, and an indium tin oxide (ITO) layer 106. The metal layer 102 is connected to the data line 102a or the scan line 102a. The gate insulating layer 104 is disposed on the metal layer 102 and has an opening 103 exposing the metal layer 102. The ITO layer 106 is foil led on the gate insulating layer 104 and is electrically contacted with the metal layer 102 through the opening 103.

To perform the electrical inspection, a probe 110 is often used to directly contact the ITO layer 106 of the bonding pad 100, so as to input signals to the data line 102a or the scan line 102a through the probe 110 and to further detect whether circuits or devices on a substrate or in a panel are defective or damaged. Given that a poor contact arises between the ITO layer 106 and the metal layer 102 and thereby results in excessive contact impedance, the abnormal impedance can also be detected by way of said inspection.

Nonetheless, if the probe 110 that is controlled in an inappropriate manner pierces the ITO layer 106 and directly contacts the metal layer 102, the signals of the probe 110 will be directly transmitted to the underlying metal layer 102. Thereby, the excessive contact impedance between the ITO layer 106 and the metal layer 102 is unlikely to be detected by way of said inspection. As such, users cannot be aware of the abnormal contact impedance between the metal layer 102 and the ITO layer 106 of the bonding pad 100.

SUMMARY OF THE INVENTION

Accordingly, the present invention is directed to a bonding pad for resolving an issue in connection with undetectable abnormal contact impedance in a conventional bonding pad.

The present invention is further directed to an active device array substrate having the aforesaid bonding pad.

As embodied and broadly described herein, the present invention provides a bonding pad including a metal layer, a gate insulating layer, a passivation layer, and a transparent conductive layer. The metal layer has a first metal pattern and a second metal pattern which are separated from each other. The gate insulating layer covers the metal layer, and the passivation layer covers the gate insulating layer. The gate insulating layer and the passivation layer have a first contact opening and a second contact opening respectively exposing a portion of the first metal pattern and a portion of the second metal pattern. The transparent conductive layer covers the passivation layer and fills the first and second contact openings. The transparent conductive layer located on the second contact opening serves as a testing-probe contact area.

The present invention further provides a bonding pad including a metal layer, a gate insulting layer, a passivation layer, and a transparent conductive layer. The metal layer is disposed on the gate insulating layer. Besides, the metal layer has a first metal pattern and a second metal pattern that are separated from each other. The passivation layer covers the metal layer. In addition, the passivation layer has a first contact opening and a second contact opening respectively exposing a portion of the first metal pattern and a portion of the second metal pattern. The transparent conductive layer covers the passivation layer and fills the first and second contact openings. The transparent conductive layer located on the second contact opening serves as a testing-probe contact area.

The present invention further provides an active device array substrate having a display region and a non-display region. The active device array substrate includes a plurality of pixels, a plurality of first bonding pads, and a plurality of second bonding pads. The pixels are disposed in the display region, and each of the pixels includes a data line, a scan line, an active device, and a pixel electrode. The first bonding pads are disposed in the non-display region, and each of the first bonding pads is electrically connected to one of the scan lines. The second bonding pads are disposed in the non-display region as well, and each of the second bonding pads is electrically connected to one of the data lines. Note that each of the first bonding pads and each of the second bonding pads are respectively referred to as the two bonding pads stated hereinbefore.

In one embodiment of the present invention, a material of the transparent conductive layer includes indium tin oxide (ITO) or indium zinc oxide (IZO).

In one embodiment of the present invention, the active device array substrate further includes at least a first driving device and a second driving device that are disposed in the non-display region. The first driving device is electrically connected to the first bonding pads, and the second driving device is electrically connected to the second bonding pads.

In one embodiment of the present invention, the active device array substrate further includes an anisotropic conductive film (ACF) interposed between the first driving device and the first bonding pads and between the second driving device and the second bonding pads.

In the present invention, the metal layer of the bonding pad is formed by the separated first and second metal patterns. Therefore, during the electrical inspection, even though the probe used for said inspection pierces the transparent conductive layer and directly contacts the second metal pattern of the metal layer, the signals of the probe are still required to be transmitted through the transparent conductive layer to the first metal pattern of the metal layer. As such, the design of the bonding pad herein is able to detect whether the abnormal contact impedance occurs between the metal layer and the transparent conductive layer during the electrical inspection in which the probe is utilized.

To make the above and other features and advantages of the present invention more comprehensible, several embodiments accompanied with figures are detailed as follows.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1A:
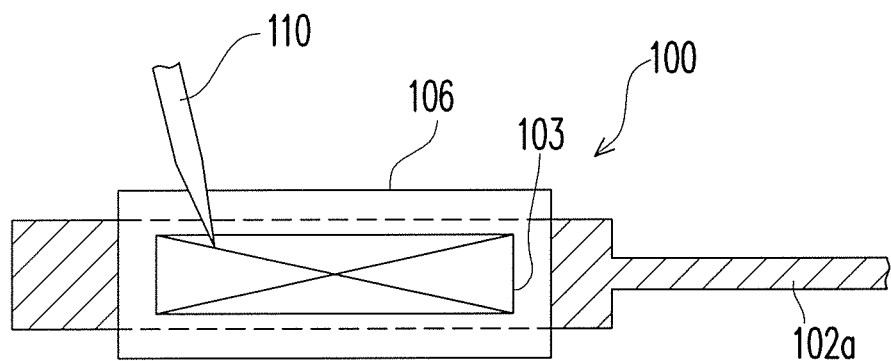
FIG. 1A is a top view of a conventional bonding pad.
Figure 1B:
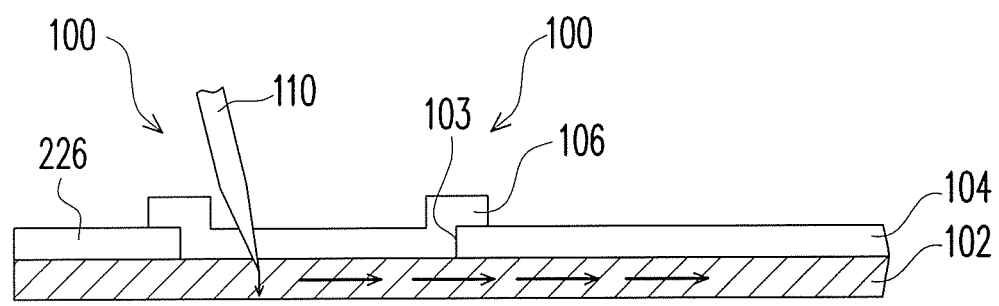
FIG. 1B is a schematic cross-sectional view of the bonding pad depicted in FIG. 1A.
Figure 2:
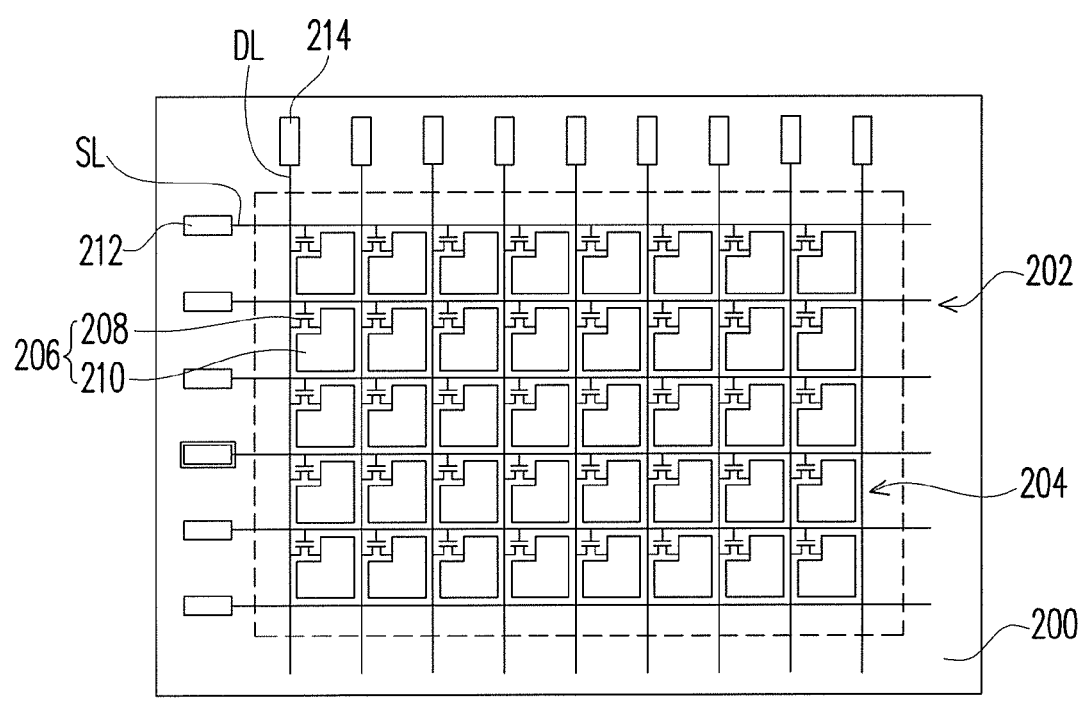
FIG. 2 is a schematic top view of an active device array substrate according to an embodiment of the present invention.

FIG. 2 is a schematic top view of an active device array substrate according to an embodiment of the present invention. In the active device array substrate as shown in FIG. 2, a plurality of devices and conductive wires are formed on a substrate 200 which has a display region 204 and a non-display region 202. A plurality of pixels 206 are disposed in the display region 204, and each of the pixels 206 includes a data line DL, a scan line SL, an active device 208, and a pixel electrode 210. In the present embodiment, the active device 208 is a thin film transistor having a gate, a source, and a drain. The gate is electrically connected to the scan line SL, the source is electrically connected to the data line DL, and the drain is electrically connected to the pixel electrode 210.

Besides, first bonding pads 212 and second bonding pads 214 are disposed in the non-display region 202. Each of the first bonding pads 212 is electrically connected to one of the scan lines SL, and each of the second bonding pads 214 is electrically connected to one of the data lines DL. That is to say, the first bonding pads 212 are connected to the scan lines SL that are extended to the non-display region 202, and the second bonding pads 214 are connected to the data lines DL that are extended to the non-display region 202. Driving devices are bonded to the first and second bonding pads 212 and 214 in subsequent processes, so as to allow signals of the driving devices to be input into the data lines DL and the scan lines SL for driving the pixels 206 in the display region 204.

Before the driving devices are bonded to the bonding pads, the pixels 206 in the display region 204 are electrically inspected by means of the bonding pads. Therefore, the first and second boding pads 212 and 214 are specifically designed according to the present invention, so as to find the undetectable abnormal contact impedance of the bonding pads during the conventional electrical inspection conducted by means of the bonding pads. Detailed descriptions are given as follows.

Figure 3A:
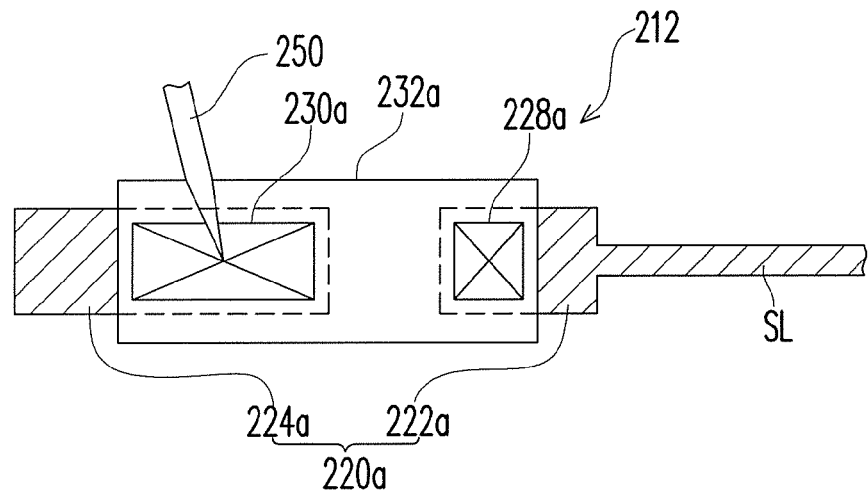
FIG. 3A is a schematic top view of a first bonding pad 212 depicted in FIG. 2.
Figure 3B:
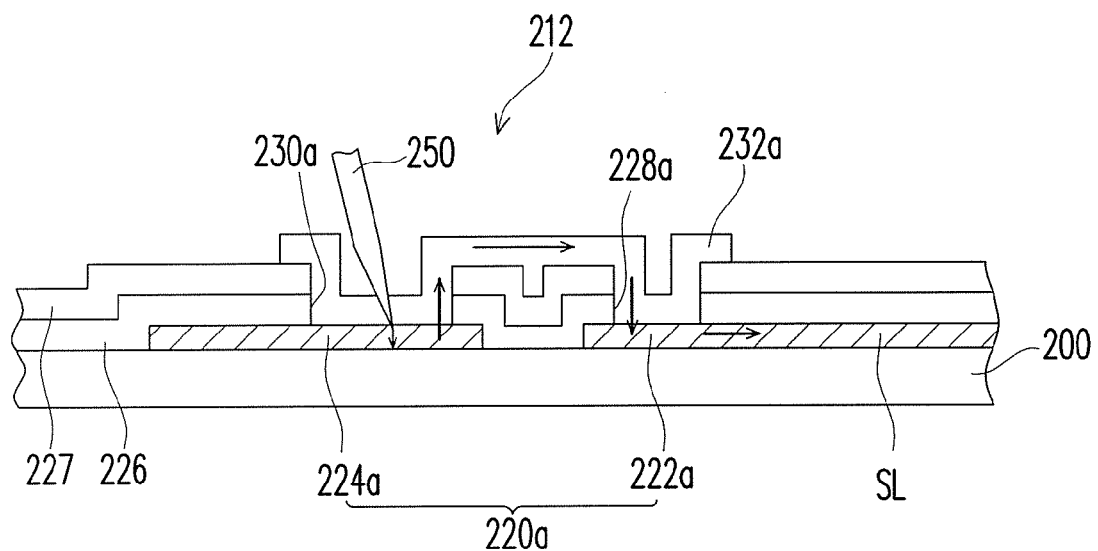
FIG. 3B is a schematic cross-sectional view of the bonding pad 212 depicted in FIG. 3A.

FIG. 3A is a schematic top view of the first bonding pad 212 depicted in FIG. 2. FIG. 3B is a schematic cross-sectional view of the bonding pad 212 depicted in FIG. 3A. Referring to FIGS. 3A and 3B, the first bonding pad 212 electrically connected to the scan line SL includes a metal layer 220a disposed on the substrate 200, a gate insulating layer 226, and a transparent conductive layer 232a.

The metal layer 220a has a first metal pattern 222a and a second metal pattern 224a which are separated from each other. The metal layer 220a and the scan line SL are formed in the same manufacturing step.

The gate insulating layer 226 covers the metal layer 220a, and the passivation layer 227 covers the gate insulating layer 226. The gate insulating layer 226 and the passivation layer 227 have a first contact opening 228a and a second contact opening 230a respectively exposing a portion of the first metal pattern 222a and a portion of the second metal pattern 224a. In the present embodiment, the gate insulating layer 226 is made of, for example, silicon nitride or silicon oxide.

The transparent conductive layer 232a covers the passivation layer 227 and fills the first contact opening 228a and the second contact opening 230a. Moreover, the transparent conductive layer 232a located on the second contact opening 230a acts as a testing-probe contact area. A material of the transparent conductive layer 232a is, for example, a transparent metal oxide, such as ITO, IZO, and so on.

When a probe 250 is used to perform the electrical inspection, the probe 250 directly contacts the transparent conductive layer 232a (the testing-probe contact area) located on the second contact opening 230a, and the signals are then transmitted to the scan line SL, so as to electrically inspect the pixels in the display region. Given that the probe 250 inadvertently pierces the transparent conductive layer 232a and directly contacts the second metal pattern 224a, the signals of the probe 250 are required to be transmitted from the second metal pattern 224a to the first metal pattern 222a through the transparent conductive layer 232a in the second contact opening 230a and in the first contact opening 228a because the first and second metal patterns 222a and 224a are separated. Thereafter, the signals are transmitted to the scan line SL. In other words, the bonding pad of the present invention ensures the signals of the probe 250 to be transmitted from the second metal pattern 224a to the scan line SL through the transparent conductive layer 232a. If there is an abnormal contact impedance between the transparent conductive layer 232a and the first metal pattern 222a, the abnormal situation can be found during the electrical inspection which utilizes the probe 250. In addition, since the abnormal contact impedance between the transparent conductive layer 232a and the first metal pattern 222a can be found before chips are bonded to the bonding pads, the inspecting accuracy of the array inspecting and the panel inspecting can be increased.

Figure 4A:
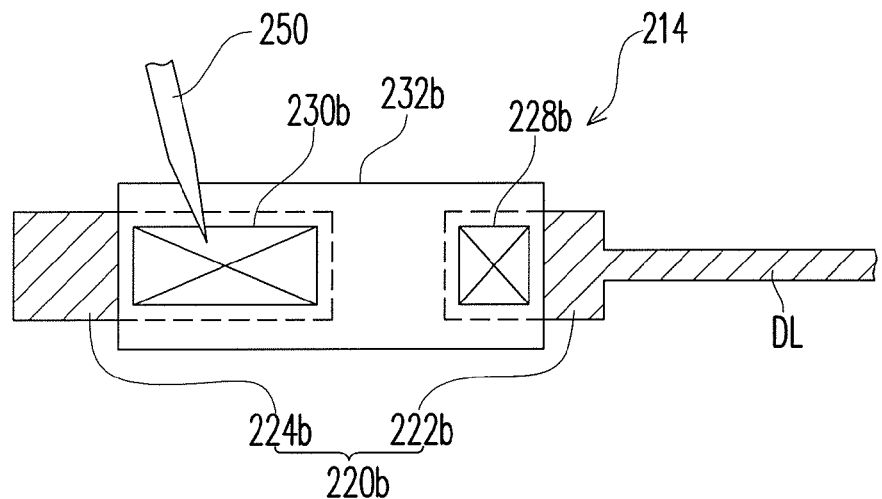
FIG. 4A is a schematic top view of a second bonding pad 214 depicted in FIG. 2.
Figure 4B:
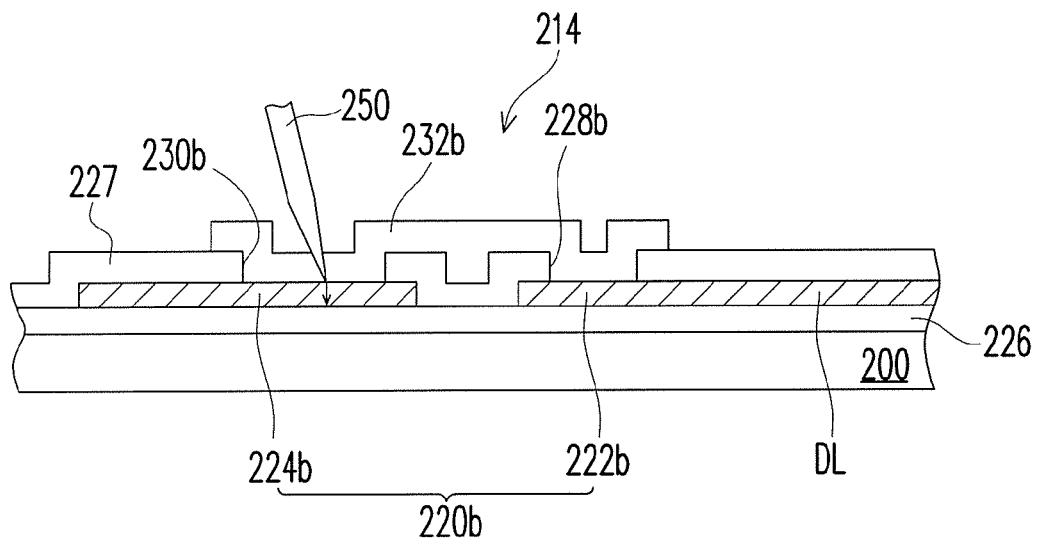
FIG. 4B is a schematic cross-sectional view of the bonding pad 214 depicted in FIG. 4A.

FIG. 4A is a schematic top view of the second bonding pad 214 depicted in FIG. 2. FIG. 4B is a schematic cross-sectional view of the bonding pad 214 depicted in FIG. 4A. Referring to FIGS. 4A and 4B, the second bonding pad 214 electrically connected to the data line DL includes the gate insulating layer 226 disposed on the substrate 200, a metal layer 220b, the passivation layer 227, and a transparent conductive layer 232b.

The metal layer 220b has a first metal pattern 222b and a second metal pattern 224b which are separated from each other. The metal layer 220b and the data line DL are formed in the same manufacturing step.

The passivation layer 227 covers the metal layer 220b. In addition, the passivation layer 227 has a first contact opening 228b and a second contact opening 230b respectively exposing a portion of the first metal pattern 222b and a portion of the second metal pattern 224b. In the present embodiment, the passivation layer 227 is made of silicon nitride, for example.

The transparent conductive layer 232b covers the passivation layer 227 and fills the first contact opening 228b and the second contact opening 230b. Moreover, the transparent conductive layer 232b located on the second contact opening 230b acts as the testing-probe contact area. A material of the transparent conductive layer 232b is, for example, a transparent conductive material, such as transparent metal oxide including ITO, IZO, and so on.

When the probe 250 is used to perform the electrical inspection, the probe 250 directly contacts the transparent conductive layer 232b (the testing-probe contact area) located on the second contact opening 230b, and the signals are then transmitted to the data line DL, so as to electrically inspect the pixels in the display region. Given that the probe 250 inadvertently pierces the transparent conductive layer 232b and directly contacts the second metal pattern 224b, the signals of the probe 250 are required to be transmitted from the second metal pattern 224b to the first metal pattern 222b through the transparent conductive layer 232b in the second contact opening 230b and in the first contact opening 228b because the first and second metal patterns 222b and 224b are separated. Thereafter, the signals are transmitted to the data line DL. In other words, the bonding pad of the present invention ensures the signals of the probe 250 to be transmitted from the second metal pattern 224b to the scan line DL through the transparent conductive layer 232b. If there is an abnormal contact impedance between the transparent conductive layer 232b and the first metal pattern 222b, the abnormal situation can be found during the electrical inspection which utilizes the probe 250. In addition, since the abnormal contact impedance between the transparent conductive layer 232b and the first metal pattern 222b can be found before chips are bonded to the bonding pads, the inspecting accuracy of the array inspecting and the panel inspecting can be increased.

Said inspection using the probe is performed on the active device array substrate and is therefore known as an active device array substrate inspection. If the active device array substrate inspection is completed and no defect is found, the active device array substrate can then be assembled to an opposite substrate, and liquid crystals can be injected. As such, the LCD panel can be formed. Detailed descriptions are given as follows.

Figure 5:
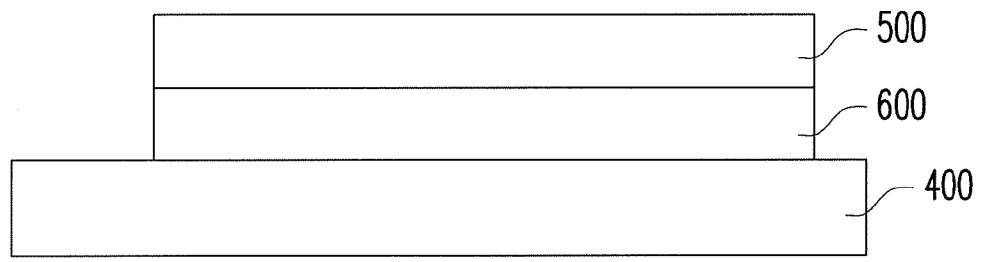
FIG. 5 is a schematic cross-sectional view of an LCD panel.

Referring to FIG. 5, an active device array substrate 400 and an opposite substrate 500 are assembled together at first, and a liquid crystal layer 600 is formed by injecting liquid crystals between the active device array substrate 400 and the opposite substrate 500. The structure of the active device array substrate 400 is as depicted in FIG. 2. Besides, the opposite substrate 500 has an electrode layer and a color filter layer, for example.

After the LCD panel indicated in FIG. 5 is completely formed, bonding pads on the active device array substrate 400 can be used to implement the electrical inspection. The inspection herein is performed after the assembly of the panel and is therefore referred to as a panel inspection.

Figure 6:
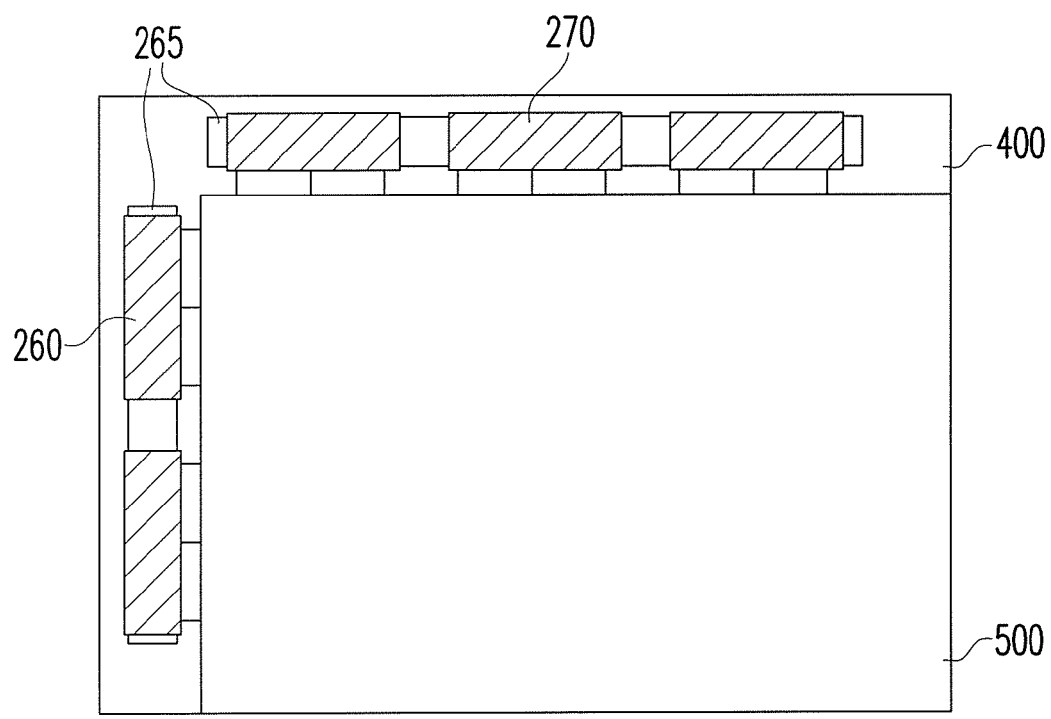
FIG. 6 is a schematic top view in which driving devices are assembled to the LCD panel.

After the panel inspection is completed and the devices on the panel are verified to have complied with relevant standards, driving devices can be bonded to the bonding pads. FIG. 6 is a schematic top view in which the driving devices are bonded to the LCD panel. Referring to FIG. 6, when the assembly of the LCD panel depicted in FIG. 5 is completed, a first driving device 260 and a second driving device 270 can then be assembled to the active device array substrate 400. Here, the first driving device 260 is electrically connected to first bonding pads on the active device array substrate 400, and the second driving device 270 is electrically connected to second bonding pads on the active device array substrate 400. In one embodiment, a method of assembling the first driving device 260 and the second driving device 270 to the active device array substrate 400 includes, for example, disposing an ACF 265 between the bonding pads and the driving devices 260 and 270. After that, a thermal compression process is implemented to attach the driving devices 260 and 270 to the active device array substrate 400. In addition, the driving devices 260 and 270 are electrically connected to the bonding pads on the active device array substrate 400.

To sum up, in the present invention, the metal layer of the bonding pad is formed by the separated first and second metal patterns. Hence, during the electrical inspection, even though the probe used therefor pierces the transparent conductive layer and directly contacts the second metal pattern of the metal layer, the signals of the probe are required to be transmitted through the transparent conductive layer to the first metal pattern of the metal layer. If there is an abnormal contact impedance between the transparent conductive layer and the first metal pattern, the abnormal situation can be found during the electrical inspection which utilizes the probe. As such, the design of the bonding pad herein is able to detect whether the abnormal contact impedance is generated between the metal layer and the transparent conductive layer during the electrical inspection in which the probe is utilized.

Although the present invention has been disclosed by the above embodiments, they are not intended to limit the present invention. Anybody skilled in the art may make some modifications and alterations without departing from the spirit and scope of the present invention. Therefore, the protection range of the present invention falls in the appended claims.

What is claimed is:
1. A bonding pad, comprising:
a metal layer, having a first metal pattern and a second metal pattern, the first metal pattern and the second metal pattern being separated from each other;
a gate insulating layer, covering the metal layer;
a passivation layer, covering the gate insulating layer, wherein the gate insulating layer and the passivation layer have a first contact opening and a second contact opening respectively exposing a portion of the first metal pattern and a portion of the second metal pattern; and
a transparent conductive layer, covering the passivation layer and filling the first contact opening and the second contact opening, wherein the transparent conductive layer located on the second contact opening serves as a testing-probe contact area.

2. The bonding pad as claimed in claim 1, wherein a material of the transparent conductive layer comprises indium tin oxide (ITO) or indium zinc oxide (IZO).

3. A bonding pad, comprising:
   a gate insulating layer;
   a metal layer, disposed on the gate insulating layer and having a first metal pattern and a second metal pattern, the first metal pattern and the second metal pattern being separated from each other;
   a passivation layer, covering the metal layer and having a first contact opening and a second contact opening respectively exposing a portion of the first metal pattern and a portion of the second metal pattern; and
   a transparent conductive layer, covering the passivation layer and filling the first contact opening and the second contact opening, wherein the transparent conductive layer located on the second contact opening serves as a testing-probe contact area.

4. The bonding pad as claimed in claim 3, wherein a material of the transparent conductive layer comprises indium tin oxide (ITO) or indium zinc oxide (IZO).

5. An active device array substrate, having a display region and a non-display region, comprising:
   a plurality of pixels, disposed in the display region, wherein each of the pixels comprises a data line, a scan line, an active device, and a pixel electrode;
   a plurality of first bonding pads, disposed in the non-display region, each of the first bonding pads being electrically connected to one of the scan lines;
   a plurality of second bonding pads, disposed in the non-display region, each of the second bonding pads being electrically connected to one of the data lines,
   wherein each of the first bonding pads comprises:
      a first metal layer, having a first metal pattern and a second metal pattern, the first metal pattern and the second metal pattern being separated from each other;
      a gate insulating layer, covering the first metal layer;
      a passivation layer, covering the gate insulating layer, wherein the gate insulating layer and the passivation layer have a first contact opening and a second contact opening respectively exposing a portion of the first metal pattern and a portion of the second metal pattern; and
      a transparent conductive layer, covering the passivation layer and filling the first contact opening and the second contact opening, wherein the transparent conductive layer located on the second contact opening serves as a testing-probe contact area.

6. The active device array substrate as claimed in claim 5, wherein each of the second bonding pads comprises:
   the gate insulating layer;
   a second metal layer, disposed on the gate insulating layer and having a third metal pattern and a fourth metal pattern, the third metal pattern and the fourth metal pattern being separated from each other;
   a passivation layer, covering the second metal layer and having a third contact opening and a fourth contact opening respectively exposing a portion of the third metal pattern and a portion of the fourth metal pattern; and
   a transparent conductive layer, covering the passivation layer and filling the third contact opening and the fourth contact opening, wherein the transparent conductive layer located on the fourth contact opening serves as a testing-probe contact area.

7. The active device array substrate as claimed in claim 5, further comprising:
   at least a first driving device, disposed in the non-display region, the first driving device being electrically connected to the first bonding pads; and
   at least a second driving device, disposed in the non-display region, the second driving device being electrically connected to the second bonding pads.

8. The active device array substrate as claimed in claim 7, further comprising an anisotropic conductive film interposed between the first driving device and the first bonding pads and between the second driving device and the second bonding pads.

9. The active device array substrate as claimed in claim 5, wherein a material of the transparent conductive layer comprises indium tin oxide (ITO) or indium zinc oxide (IZO).

* * * * *